United States Patent
Lai

(10) Patent No.: US 6,924,975 B2
(45) Date of Patent: Aug. 2, 2005

(54) COMPUTER CASE WITH SIDE PANEL CLIP FASTENING

(75) Inventor: Vincent Lai, Taoyuan Hsien (TW)

(73) Assignee: In Win Development, Inc., Taoyuan Hsien (TW)

(*) Notice: Subject to any disclaimer, the term of this patent is extended or adjusted under 35 U.S.C. 154(b) by 183 days.

(21) Appl. No.: 10/639,433

(22) Filed: Aug. 13, 2003

(65) Prior Publication Data

US 2005/0036280 A1 Feb. 17, 2005

(51) Int. Cl.$^7$ .................... G06F 1/16; H05K 5/00; A47B 81/00
(52) U.S. Cl. .................. 361/683; 361/679; 312/223.2; 292/207; 292/256.75; 24/453; 403/326; 403/329; 403/348; 403/349; 403/353; 403/14
(58) Field of Search ............... 361/679, 638, 361/686, 724–727; 292/207, 116, 256.75; 312/223.1, 223.2; 24/453; 403/326, 329, 348, 349, 353, 14, 316; D14/349, 353, 354, 356

(56) References Cited

U.S. PATENT DOCUMENTS

| | | | | |
|---|---|---|---|---|
| 5,713,647 A | * | 2/1998 | Kim ....................... 312/223.2 |
| 5,732,000 A | * | 3/1998 | Chiesi et al. ............... 361/679 |
| 5,743,606 A | * | 4/1998 | Scholder .................. 312/223.2 |
| 5,751,545 A | * | 5/1998 | Jung .......................... 361/683 |
| 5,967,633 A | * | 10/1999 | Jung ....................... 312/223.2 |
| 5,997,115 A | * | 12/1999 | Radloff et al. .............. 312/222 |
| 6,015,195 A | * | 1/2000 | Anderson et al. ......... 312/223.2 |
| 6,161,909 A | * | 12/2000 | Huang .................... 312/223.2 |
| 6,373,692 B1 | * | 4/2002 | Cheng ........................ 361/683 |
| 6,398,325 B1 | * | 6/2002 | Chen et al. ............. 312/223.2 |
| 6,698,853 B2 | * | 3/2004 | Chen et al. ................. 312/263 |
| 6,795,307 B2 | * | 9/2004 | Arbogast et al. ........... 361/683 |
| 2001/0030429 A1 | * | 10/2001 | Yen et al. ................... 292/207 |

* cited by examiner

Primary Examiner—Lisa Lea-Edmonds
(74) Attorney, Agent, or Firm—Bacon & Thomas PLLC

(57) ABSTRACT

A computer case with side panel clip fastening configuration utilizing a direct clip fastening method to quickly secure side panels of a computer case to a computer case housing. An inner catch first lodges into a notch defined on the side panel, and subsequently rotated 90° therein to secure its positioning. The configuration further employs a cylindrical positioning socket configured on the clip fasteners to pass through through-holes defined in the side panels and thereupon into securing holes defined in the computer case housing. The side panels and computer case housing are thereby assembled to form a computer case in its entirety.

4 Claims, 4 Drawing Sheets

COMPUTER CASE WITH SIDE PANEL CLIP FASTENING

BACKGOUND OF THE INVENTION (a) Field of the Invention

The present invention relates to a computer case with side panel clip fastening configuration, and more particularly to a clip fastening configuration not requiring the use of screws to bolt down the side panels of the computer case, instead employing clip fasteners to quickly facilitate direct fastening down of the side panels to two sides of a computer case housing thereof.

(b) Description of the Prior Art

FIG. 1 shows a computer case housing 100 of a general computer case 10 comprising panels including a face panel 200, top panel 300, and two side panels 400, wherewith the computer case housing is encased therein. The fastening method adopted to secure the two side panels employs screws A to pass through through-holes 401 in the side panels 400, whereupon the screws A are screwed down into the screw holes 101. This fastening configuration has the following drawbacks:
1. Labor intensive;
2. Time consuming;
3. Requiring use of a screwdriver;
4. Difficult to assemble under mass production conditions;
5. A lot of work and time is wasted when dismantling for maintenance and repair purposes.

SUMMARY OF THE INVENTION

The primary objective of the present invention is to utilize a direct clip fastening method, whereby clip fasteners facilitate quick fastening of side panels to two sides of a computer case housing, thereby achieving savings in manual effort and man-hours, as well as providing an extremely simple and easy method of dismantling when maintenance and repair needs arise.

To enable a further understanding of the said objectives and the technological methods of the invention herein, the brief description of the drawings below is followed by the detailed description of the preferred embodiments.

DESCRIPTION OF THE PREFERRED EMBODIMENTS

Figure 1:
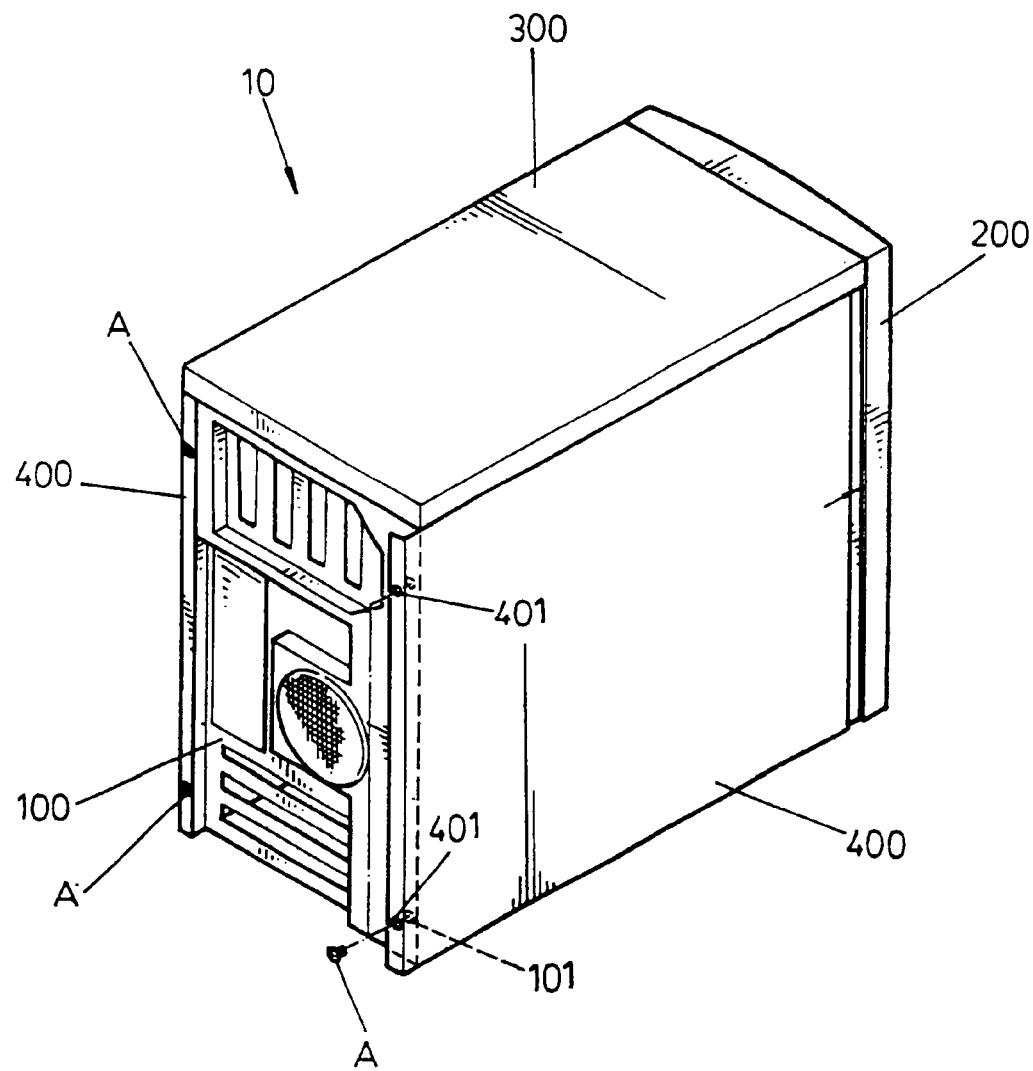
FIG. 1 shows an elevational view of a conventional computer system.
Figure 2:
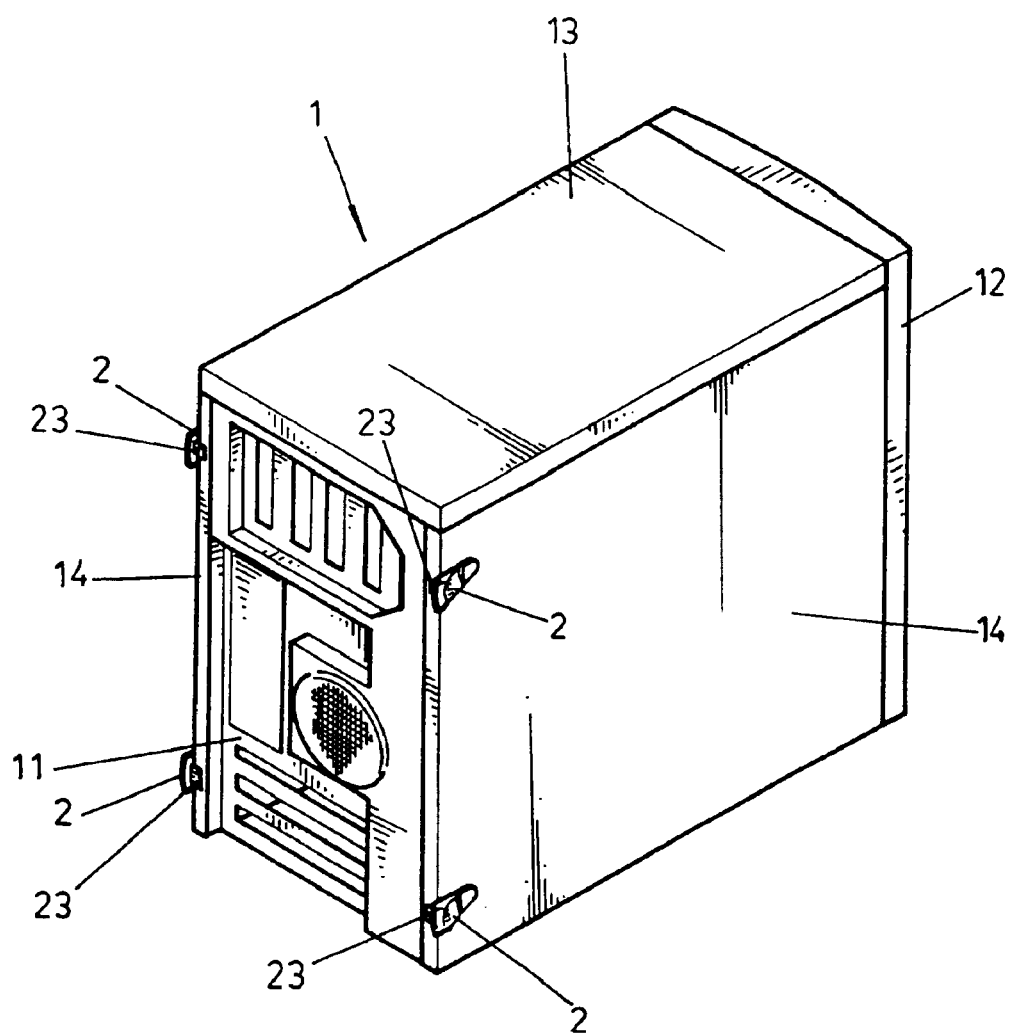
FIG. 2 shows an elevational view according to the present invention.
Figure 3:
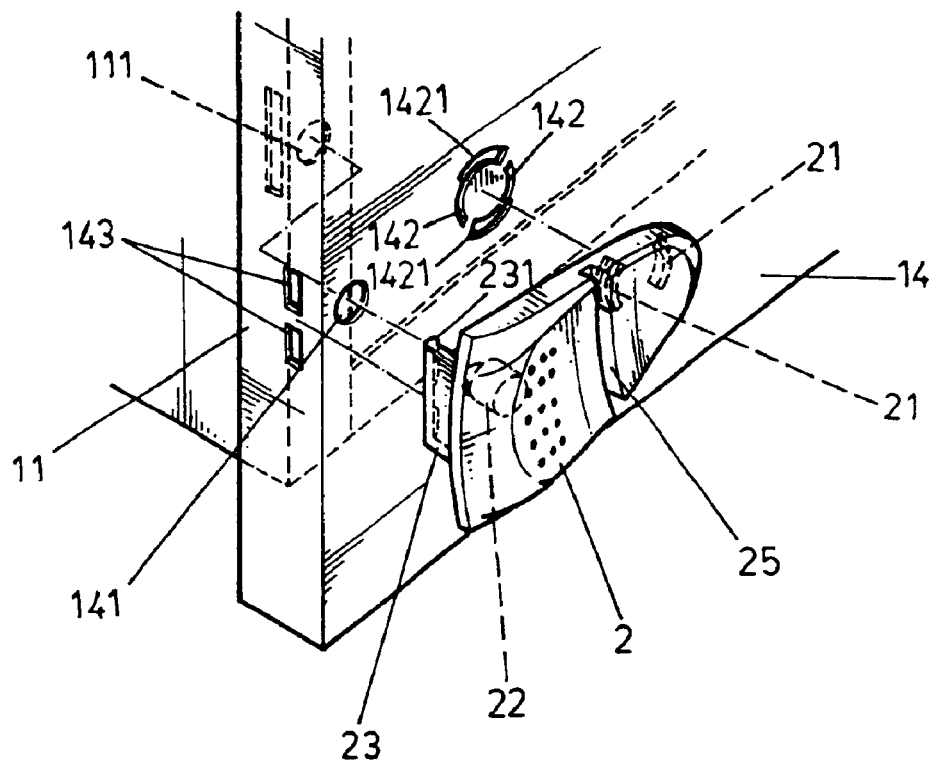
FIG. 3 shows a partial exploded view according to the present invention.
Figure 4:
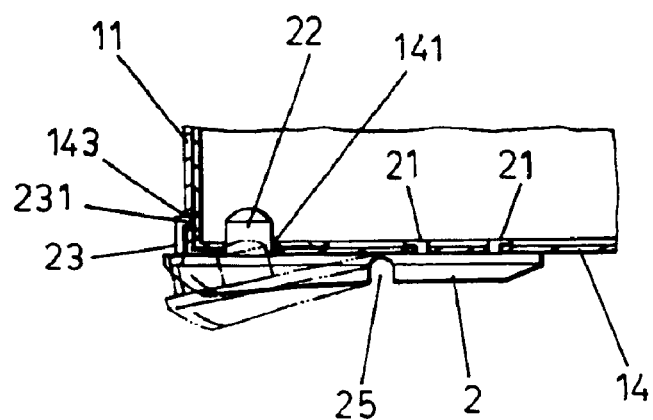
FIG. 4 shows a partial cross sectional view according to the present invention.
Figure 5:
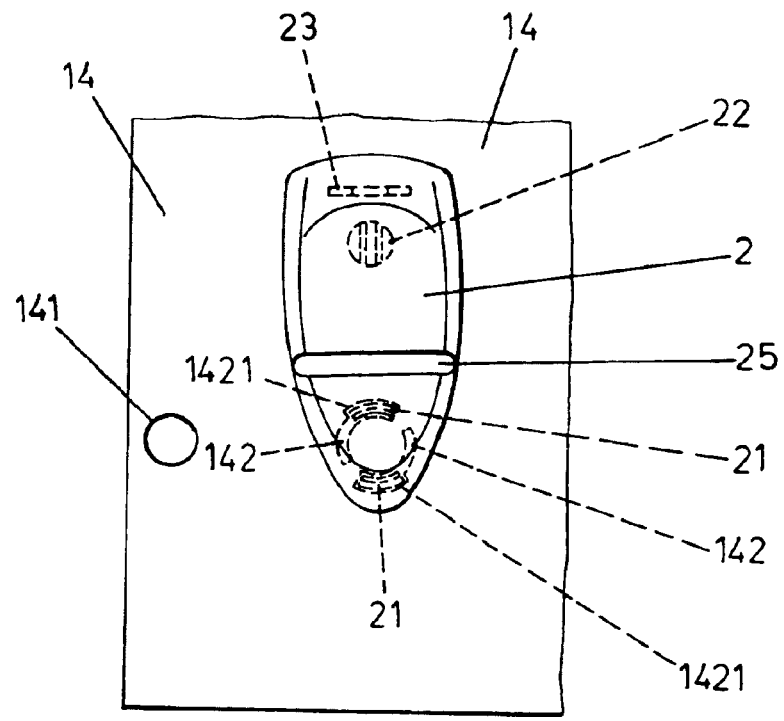
FIG. 5 shows a partial side view according to the present invention.
Figure 6:
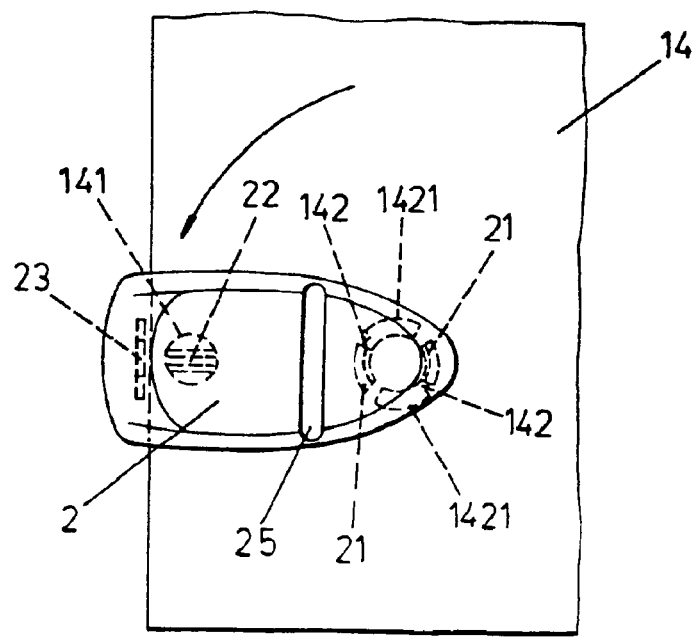
FIG. 6 shows a partial side view of the clip fastener being rotated according to the present invention.

FIGS. 2 and 3 show a computer case with side panel clip fastening configuration according to the present invention comprising a face panel 12, a top panel 13 and side panels 14 secured to the inner edges of the computer case housing 11 thereof. Its main features include:

Two side panels 14 separately utilizing two clip fasteners 2 respectively configured on the top and bottom of the side panels 14, thereby securely fastening the side panels 14 to the computer case housing 11. Taking one embodiment of the clip fastener 2 as an exemplary case, a round securing hole 111 is defined in the rear edging of the computer case housing 11. A round through-hole 141 is further defined near the rear edge of the side panels 14. On one side, and close to the through-hole 141, is defined two arc-shaped notches 142 for fastening purposes, the two said notches 142 forming a circular arc-shaped tracks thereof. One half of each of the notches 142 is respectively defined with a catch-slot 1421 forming a groove. The diameter of the grooves of the catch-slots 1421 are slightly larger than the notch tracks of the notches 142, thereby facilitating catches 21 on the clip fastener 2 to lodge into. The two catches 21 of the clip fastener 2 are identical in shape to the two catch-slots 1421. The edge of the catches 21 are adapted to be L-shaped (see FIG. 4), thereby facilitating the catches 21 to lodge into the catch-slots 1421. The clip fastener 2 is configured to be rotated 90° while lodged in the notches 142 following the arc-shaped track of the notches 142. [see FIG. 5 (before rotating) and FIG. 6 (after rotating 90°)], thereby changing the direction of the clip fastener 2 by 90°.

A cylindrical positioning socket 22 is configured close to the edge of the clip fastener 2. The positioning socket 22 is configured to pass through the through-hole 141 of the side panel 14 and a securing hole 111 of the computer case housing 11 (see FIG. 4), thereby fastening the side panels 14 to the edge of the computer case housing 11 thereof. A catch-hook 23 is configured at the edge of the clip fastener 2 and close to the positioning socket 22. Two L-shaped ribs 231 are configured on the edge of the catch-hook 23. The ribs 231 facilitate hooking into two slits 143 defined in the folded edge of the side panels 14, securely positioning the clip fasteners thereof (see FIG. 6). A horizontal groove 25 is defined on the face of the clip fastener 2. The groove 25 acts as a fulcrum thereby facilitating bending of the clip fastener 2 about the groove 25 (see imaginary-drawing lines in FIG. 4).

Upon the two side panels being positioned, the catches 21 of the clip fasteners 2 are lodged into the catch grooves 142 on the side panels 14 (see FIG. 5), thereupon the clip fasteners 2 are rotated 90° enabling the catches 21 to slide along the notches 142 defined in the side panels 14 thereof (see FIG. 6), thereupon each positioning socket 22 is passed through the through-holes 141 of the side panels 14 and the securing holes 111 of the computer case housing 11, thereby fastening the side panel 14 to the computer case housing 11. Catch-hooks 23 configured on the clip fasteners 2 are hooked into the slits 143 of the side panels 14, thereby quickly accomplishing the entire fastening configuration of the side panels, whereby the side panels 14 are simply and easily secured to the computer case housing thereof.

In conclusion, a computer case with side panel clip fastening configuration of the present invention does away with the need for screws and screwdrivers, and instead utilizes a clip fastener to facilitate the quick fastening of side panels to a computer case housing thereof.

Its of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A computer case with side panel clip fastening configuration, comprising clip fasteners to fasten two side panels of the computer case to two sides of a computer housing, wherein securing holes are defined in the edges of the computer housing, and slits are further defined close to the securing holes; through-holes are defined close to the edges of the side panels, and two notches having notch tracks for fastening purposes are further defined near to the through-holes, catch-slots are defined in one-half of the notches forming grooves, such that the diameter of the grooves of the catch-slots are larger than the notch tracks of the notches, thereby facilitating catches configured on the clip fasteners to lodge therein; the clip fastener is configured to follow along the notch track upon rotating, thereby enabling rotating therein; a positioning socket is configured close to the edge of the catch, thereby passing through a though-hole in the side panels and a securing hole defined in the computer housing, thereby securely fastening the side panels to the computer case housing.

2. The computer case with side panel clip fastening configuration according to claim 1, wherein a catch-hook is configured on the edge and close to the positioning socket of the clip fastener; ribs on the edge of the catch-hook enable the catch-hook to hook into slits defined in the folded edges of the side panels, thereby securing the positioning of the clip fastener thereof.

3. The computer case with side panel clip fastening configuration according to claim 1, wherein a horizontal groove is configured on the face of the clip fastener, whereby the groove acts as a fulcrum enabling the clip fastener to flex and pivot thereof.

4. The computer case with side panel clip fastening configuration according to claim 1, wherein edges of the catches configured on the clip fastener are adapted to be L-shaped, thereby facilitating the clip fastener to rotate along a notch, thereby changing the direction of the clip fastener thereof.

* * * * *